Figure 1:
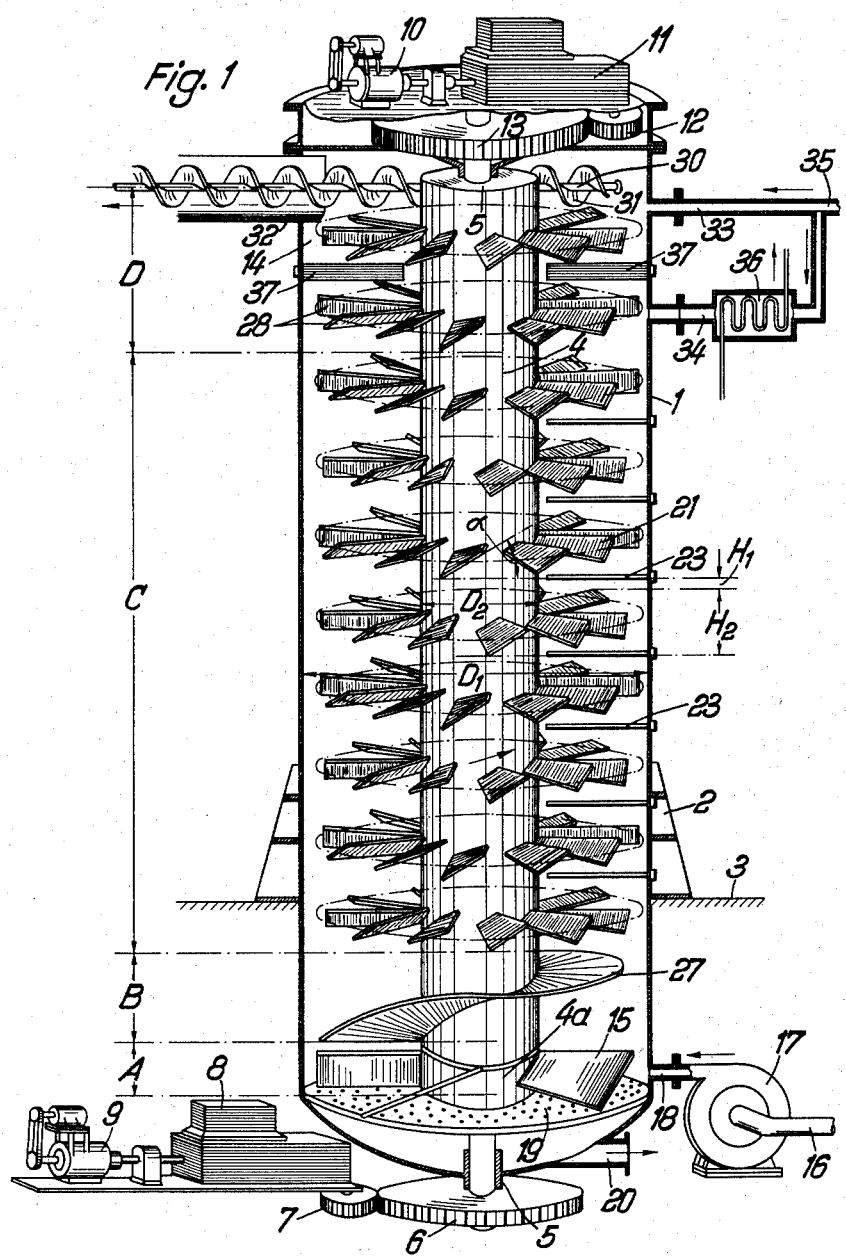

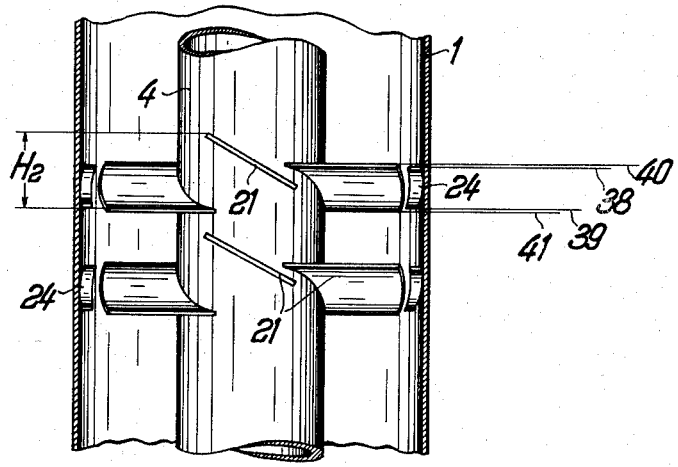

United States Patent Office 2,927,007
Patented Mar. 1, 1960

2,927,007

APPARATUS FOR THE TREATMENT OF ANIMAL AND VEGETABLE MATERIALS

Willy Kaether, Braunschweig-Melverode, Germany, assignor to Braunschweigische Maschinenbauanstalt, Braunschweig, Germany Application April 16, 1958, Serial No. 728,901

Claims priority, application Germany April 17, 1957

3 Claims. (Cl. 23—270)

This invention relates to an apparatus for extracting, bleaching or washing animal and vegetable materials, for example sugar-beet slices, disintegrated sugar cane or cellulose, by means of a liquid, usually water.

Known apparatus of this kind consist of a tower-like vessel through which the material to be treated is moved from below upwardly by a conveyor device whereas the liquid flows in countercurrent downwardly from the top of the vessel and is withdrawn at the lower end of the vessel, for example, through a screen. For conveying the material to be treated, a worm conveyor is used which is fixed to a rotatable shaft disposed in the axis of the vessel and the turns of the conveyor are interrupted by retaining or blocking members which are fixed to the wall of the vessel and extend radially towards the shaft. In the known apparatus stoppages may occur, and, above all, when sugar-beet slices are being treated, the slices may be damaged during their upward conveyance, which leads to considerable losses because slices which have been much disintegrated and leached out are not readily utilizable. The main disadvantage is that the disintegrated or damaged slices irregularly consolidate the mass being moved in the tower and prevent the liquid from flowing down uniformly over the cross-section of the tower. The throughflow of the liquid through the mass of the material is considerably retarded and the hourly output of the tower is greatly reduced. Sugar-beet slices which are to be treated in the known continuously operating extraction tower must, therefore, be cut up very carefully. In the known extraction towers formation of pulp to an extent of about 20 to 25% takes place. The term "pulp" means parts of slices which are less than one centimetre in length. When treating sugar-beet which has been damaged by the action of frost and become soft, these drawbacks occur to an increased extent.

The invention is based on the consideration that this formation of pulp is primarily caused by the retaining or blocking members which are present in all known diffusion towers. In a diffusion tower of the usual size, about 120 of such blocking members with a total weight of about 9,000 kg. are fitted. The fitting of these members necessitates a difficult and expensive construction to the casing of the tower, because each blocking member must have a hole cut out for its insertion and removal, and local strengthening of the casing around the hole is necessary.

The apparatus of the present invention, which is also in the form of a tower, differs from the known apparatus of this kind in the first place by the subdivision of the tower into three zones of which each individual zone has a definite task to perform. A different form of conveyor means is provided in each of the zones.

In the lower part of the tower there is a stirring zone which has a screen at the bottom and in which a plurality of distributor and lifting blades, which are inclined to the axis of a shaft which carries them, rotate. The material which has been cut up and mixed with conveying liquid is pumped into this zone and is raised upwardly by the distributor blades into the adjacent treatment zone.

In the treatment zone a plurality of blade wheels are arranged at a distance apart above one another and are fixed to a shaft which rotates in the axis of the tower; the blades of these wheels are of fan-like form and inclined to the axis of the shaft. Experiments have proved that it is of considerable advantage to displace the blades of a blade wheel as regards their heights, that is to say to step them.

In the apparatus according to the invention the spaces between each two of these blade wheels in the treatment zone, as distinguished from the known diffusion towers, are no longer provided with blocking members or members having a similar action. The conveyance of the material to be treated is effected by the following means:

(1) By maintaining a definite ratio between the diameter of the tower and the diameter of the shaft carrying the blade wheels.

(2) By maintaining a certain ratio between the height of the free space between two adjacent blade wheels and the height of the blade wheels.

(3) By the angle of the inclination of the individual blades of all the blade wheels to the axis of the shaft.

(4) By maintaining a definite proportion of liquid in the mixture of material to be treated and liquid, and (5) By the speed of rotation of the tower shaft.

By using all these means in common, the conveyance is effected in such a manner that the slices flow upwardly in the extraction liquid into an ejection zone located above the treatment zone. In the ejection zone blade wheels are provided on the tower shaft similar to those in the treatment zone. As distinguished from the conditions in the treatment zone, however, radial guide plates fixed to the wall of the tower are arranged in the free spaces between each two adjacent blade wheels in the ejection zone.

The ejection of the treated material takes place at the upper end of the ejection zone which is provided at this place with a horizontal or slightly inclined worm conveyor.

If the above-mentioned conditions for the conveyance of the material in a flow process are maintained, the nature of the material and the kind of treatment, namely extraction, bleaching, washing and so forth must, of course, be taken into account.

An extraction tower having the following features has proved to be particularly suitable.

(1) Ratio of the diameter $D_1$ of the tower to the diameter $D_2$ of the shaft carrying the blade wheels=2 to 2.5 (Fig. 1).

(2) Ratio of the height $H_1$ of the free space between two adjacent blade wheels to the height $H_2$ of the blade wheels is at most 1 (Fig. 1).

(3) The angle $\alpha$ of the blades of all the blade wheels in the treatment zone to the axis of the tower shaft=10° to 25° (Fig. 1).

(4) Proportion by weight of liquid in the mixture of treatment material and liquid=more than 40%, preferably approximately 60%.

(5) Speed of revolution of the tower shaft=20 to 40% of the speed of revolution of the shaft of an extraction tower operating with blocking members.

The shaft which rotates in the axis of the tower can be made of two independent parts and each part may have its own drive. The shaft may, however, have a single drive either at the end of the ejection zone or below the stirring zone.

The material which is pumped-in is separated from the conveying liquid in the stirring zone owing to the fact that, during the stirring and distribution of the slices, the liquid runs away through the screen forming the bottom of this zone. The liquid which has been enriched with the material to be separated and flows from top to bottom through the tower also flows away through this screen. It is removed from the tower through an outlet below the screen.

The distributor blades of the stirring zone effect a loosening of the slices which are uniformly raised by them into the treatment zone above the stirring zone. In the treatment zone the slices are acted on by the numerous blades fixed to the tower shaft and set into vigorous movement, and rise further towards the top. The entire surface of the lighter or floating particles is washed with liquid without interference so that a high and also a particular uniform degree of extraction is obtained. Blockages and damage to the slices within the treatment zone do not occur. The ratio of liquid to slices in the treatment zone is always uniform. In the uppermost zone, i.e. the short ejection zone, the slices arrive in a region in which the free spaces between the blade wheels are again provided with guide plates, so that the extracted slices are conveyed quickly by mechanical means out of the tower. In this way, the processes which take place in the treatment zone of the tower are not affected and the extracted material is ejected in a comparatively dry state from the tower.

The greater part of the liquid is preferably supplied to the tower at a place between the ejection zone and the treatment zone. When the liquid is supplied in this manner, an additional cooling or washing process for the material to be extracted or washed can be interposed in the ejection zone, for example, by also introducing a part of the liquid into the tower at the upper end of the ejection zone. In order to cool the material in the ejection zone and to avoid the necessity for a separate cooling device, it is advisable to supply the liquid which is introduced from below into the ejection zone of the tower at a higher temperature and the liquid which is introduced into the upper end of the ejection zone at a lower temperature. A separate heating device can be included in the pipes by which the liquid is admitted to the lower end of the ejection zone, whereas the liquid introduced into the tower above the ejection zone is not heated but is cooled.

It is advisable to distribute the blades of the blade wheels in the treatment zone as well as those in the ejection zone in such a way that the blades of a lower wheel cover the gaps between the blades of the wheel above it. By this means, if the conveying device should by any chance cease to work, the slices will be prevented from sinking downwards and thereby forming a compact mass at the lower end of the tower.

In operating an apparatus according to the invention it may happen, for example, as the result of a fault in the treatment zone, that sufficient liquid is not supplied, so that the flow processes which otherwise proceed there are interrupted or interfered with. If this happens the slices become dammed up in the treatment zone and it would be difficult or even impossible to put the apparatus into operation again owing to the lack of liquid without temporarily effective guide plates, because the conveyance of the slices in the treatment zone depends on pure flow processes. In order in such a case also to be able to work without loss, one or more radially directed auxiliary guide plates are provided in the free spaces between each two adjacent blade wheels in the treatment zone. These guide plates are fixed to the wall of the tower on axes which run at right angles to the axis of the tower and the guide plates may be turned on these axes and fixed in any desired position. In normal operation these guide plates are disposed in a position in which they exert no, or no substantial influence on the flow of the liquid and of the treatment material. If disturbances of the above-mentioned kind occur, the guide plates are brought into an operative position, after which the further conveyance of the material which can no longer be conveyed by purely hydraulic means, takes place by mechanical means, the speed of revolution of the tower shaft being increased, if necessary.

When working with materials which are particularly difficult to treat, there may be associated with each blade wheel in the treatment zone a group of guide plates of which the upper and lower boundary edges are situated within the boundary planes of the corresponding blade wheel. These guide plates facilitate the conveyance of the material being treated but result in no or no appreciable damming of or damaging effect on the material being treated. They may be set at the same angle to the axis of the tower shaft as the blades of the blade wheels or at an opposite angle.

According to a further feature of the invention, a separating zone can be provided between the stirring zone and the treatment zone, a worm conveyor or the like which effects a certain amount of separation being provided on the tower shaft in the separating zone. The purpose of this worm conveyor is also to convey the material being treated upwardly in countercurrent to the flow of liquid. This worm conveyor also has the object of effecting a separation of the flow conditions in the stirring and in the treatment zone. Thus, there is a very strong flow in the stirring zone, because the material being treated is pumped together with up to 400% of liquid into this zone, whereas in the treatment zone the mixture being treated contains a considerably smaller proportion of water. By means of the separating zone provided with the conveyor worm, interference with the flow in the treatment zone by the strong flow of liquid into the stirring zone is avoided with certainty.

Apparatus in accordance with the invention is illustrated by way of example in the accompanying drawings, in which Fig. 1 is a vertical section through the tower showing the tower shaft with the conveyor devices fixed to it, and Fig. 2 is a vertical section of a part of the treatment zone in a modified form of construction.

Referring to Fig. 1 of the drawings, the casing of the cylindrical tower 14 is designated by the numeral 1. The tower is supported by brackets 2 on a foundation 3. A hollow shaft 4 rotates in bearings 5 in the axis of the tower. As shown in Fig. 1, the shaft 2 consists of two separate parts. The lower part 4a is driven by toothed wheels 6 and 7 and a gearing 8 from an electric motor 9. The upper longer part of the shaft is driven from an electric motor 10 through gearing 11 and toothed wheels 12 and 13. The toothed wheels 6 and 7 and 12, 13 are arranged beside the tower 14.

The extraction tower is divided into four zones, namely a stirring zone A, a separating zone B, a treatment zone C and an ejection zone D.

Stirring blades 15 which are inclined to the axis of the shaft part 4a are mounted on the lower shaft part 4a in the stirring zone A. The slices which have been made capable of being pumped with the aid of water, or with a liquid which has been enriched with sugar, are pumped into this zone by a pump 17 having a suction pipe 16 and a delivery pipe 18. The stirring blades 15 distribute the pumped material uniformly over the cross-section of the tower 1 and, owing to their inclined setting, raise the material into the separating zone B above the stirring zone.

The stirring zone is provided at the bottom with a screen 19 through which the liquid required for making the slices capable of being pumped and the sugar-enriched liquid coming from above run off. The concentrated sugar solution is discharged through the pipe 20.

In the separating zone B the tower shaft 4 has a worm conveyor 27 which raises the material being treated from the stirring zone A into the actual treatment zone C and prevents the flows in these two zones affecting one another.

The section of the hollow shaft 4 which passes through the treatment zone C carries blade wheels arranged one above another, the blades 21 of which are arranged in fan-like fashion and are inclined to the plane of the wheels and, as shown in Fig. 1, are so arranged on the hollow shaft 4 that the blades of a lower row cover the gaps between two adjacent blades of the row above it. A part of the blades, preferably each second blade is upwardly displaced, as shown in Fig. 2, relative to the plane of the remaining blades.

The blades 21 consist of plane plates and the blades are connected to the hollow shaft 4 at the same angle of inclination α relative to the plan of the blade wheel. Therefore, all the edges of the blades which are at the rear in the direction of rotation lie in an upper plane and all the leading edges of the blades lie in a plane below the above-mentioned plane.

Guide plates 23 fixed to the casing 1 of the tower project radially into the free spaces between two superimposed blade wheels. The inclination of these guide plates can be altered. As shown in Fig. 1, in normal operation the blades are fixed in a position in which they have no or no appreciable influence on the conditions of flow within the treatment zone C. This position is approximately horizontal or inclined obliquely upwardly parallel to the blades 21 of the blade wheels. In order to enable the guide plates to be turned from the outside of the tower about axes at right angles to the axis of the tower shaft, the guide plate can be fixed to the wall of the tower, for example by means of a bolt which is fixed to the plates and which passes outwardly through the wall of the tower and onto which two nuts are screwed. These nuts are released when the angle of inclination of the guide plates is to be altered and are again tightened after the plates have been adjusted.

The ejection zone D which adjoins the top of the treatment zone C is provided with blades 28 similar to those in the treatment zone C. In this case, however, guide plates 37 fixed to the wall 1 of the tower project radially into the spaces between two adjacent blade wheels. These guide plates effect a mechanical upward conveyance of the material because in the ejection zone D no mixing of liquid takes place or the mixing is less than in the treatment zone C, so that a certain amount of drying of the treated material is effected before its removal from the tower. Up to ten of such guide plates 37 are provided between each pair of blade wheels 28. A certain amount of disintegration of the treated material does, however, take place in the ejection zone D. The amount of pulp formed, is, however, small, because the height of the ejection zone D is small compared with the total height of the tower.

A conveyor worm 30, 31 is arranged at the upper end of the ejection zone D, and this conveys the extracted material through the pipe 32 to the outside.

The liquid required for extraction enters the tower through the pipes 33 and 34 which are branched off from a collecting pipe 35. The pipe 33 opens into the upper end of the ejection zone D and the pipe 34 opens into the lower end of this zone. A heating device 36 can be provided in the pipe 34 if desired, and similarly a cooling device may, if necessary, be provided in the pipe 33.

The modified construction illustrated in Fig. 2 is intended for treating materials which are particularly sensitive and difficult to treat. In this case, a group of guide plates 24 which are inclined to the axis of the shaft 4 carrying the blade wheels and are fixed to the wall 1 of the tower is associated with each blade wheel 21 within the treatment zone C. The upper edges 38 of these guide plates and their lower edges 39 are situated between the upper boundary plane 40 and the lower boundary plane 41 respectively of the corresponding blade wheel 21.

The most important physical and flow principles of the apparatus of the invention which enables the material to be extracted to be conveyed in countercurrent to the extraction liquid without the use of retaining or damming members which were hitherto considered to be necessary, are as follows:

As is known, the flow forms which develop in liquids owing to the movement of bodies (in this case the blades) depend to a decisive extent on the kinematic viscosity $\nu$ of the medium in which they move.

The value $\nu$ is the ratio $\mu/\rho$=coefficient of viscosity to density and forms the denominator of right-hand side of the equation for the Reynolds number $$R = \frac{v \cdot l}{\nu}$$

$v$ being the velocity of flow and $l$ the length of the body in the direction of movement.

As stated in Prandtl "Strömungslehre" published by Vieweg & Sohn, 1942, the mathemical treatment of the movement of bodies in viscous liquids has proved to be so difficult that hitherto only some limiting cases could be dealt with. In general, it may be said, however, that if the viscosity is great any inertia effect can be neglected as being small compared with viscosity effects. Then in any portion of liquid equilibrium between the pressure drop and the frictional force has to be established.

The characteristic feature of the flow processes which take place in the apparatus of the invention is that two media having quite different viscosities and quite different coefficients of frictions are set in movement by the rotating blades.

The value of the kinematic viscosity of water at 0° C. amounts to only 0.0178 cm.$^2$/s. and falls at 20° C. to 0.0100 cm.$^2$/s. The value of the kinematic viscosity of the extraction materials is different but can be considered on the average to be about 7.0 cm.$^2$/s. Owing to this difference in viscosity, quite other laws of flow apply to the movement of the material to be extracted than to the extraction liquid.

The above-mentioned book by Prandtl gives the experimental results for the limits to which the occurrence of the so-called "creeping flow" can be assumed. This expression means those flows in which, owing to the great viscosity of the medium, the inertia forces are negligible as compared with the friction forces.

Creeping flows have the characteristic, as distinguished from more rapid flows, that the resistances to movement are proportional to the first power of the speed. They, therefore, obey Stokes resistance law and not the law of increase of resistance with the square of the velocity.

According to the above-mentioned experiments, the laws for creeping flow hold good approximately up to a Reynolds number of $R=10$. From a value of $R=10$ to 200 a gradual transition takes place from the range of creeping flow into the range in which the square resistance law holds good.

In the lower part of the transitional range, according to the above-mentioned estimates the material being extracted in the lower part of the tower has a Reynolds number of $R=$approximately 45, whereas the water in the present conditions obeys the laws which correspond to a Reynolds number of $R=30,000$.

From photographs of the flow process which takes place in the above-mentioned experimental apparatus which was made of glass, it can be clearly seen that a pressure zone is built-up on the upper side of the blades during their movement through the medium, which pressure zone in spite of the lateral movements due to the horizontal components of the force, produces a resultant upward movement of the material being extracted. On the lower side of the blades a suction zone is formed but this is not strong enough to accelerate the movement of the extraction material upwardly, it does however contribute towards facilitating the separation of the extraction liquid from the material being extracted.

Since, as mentioned above, the friction forces in the case of creeping flows are of decisive importance, it is necessary for explaining the surprising effect of the invention, to consider also the effect of the friction on the inner surfaces of the wall of the tower. The friction at this wall contributes towards retarding the undesired horizontal, i.e. rotary, movement of the extraction material, and assisting its upward movement. Furthermore, the end disc effect of the wall is important for building up the pressure zone at the outer parts of the blades.

Since both the internal friction of the extraction liquid and also its friction on the wall of the tower is much smaller than that of the extraction material, the extraction liquid is not affected in the same way by the processes described. It flows away under the influence of gravity in countercurrent to the extraction material at the bottom of the apparatus. The extraction material itself, on the other hand, owing to the above-mentioned pressure zone at the upper side of the blades, is brought out of the range of action of the ring of blades below it into that of a higher ring of blades. Thus, a continuous conveyance of the extraction material takes place upwardly with separation of the extraction material from the extraction liquid.

The upward movement of the extraction material is also assisted by the buoyancy of the extraction material in the extraction liquid. Although the difference in the specific gravities of the two substances is not great, nevertheless this difference acts to effect movement in the sense desired.

The improvement obtained with the extraction apparatus of the invention as compared with known apparatus consists essentially in an improvement in the extent to which the extraction material is leached out in a tower which is of smaller height and can be operated with great certainty. These effects are obtained owing to the division of the tower into three or four zones each having a separate task to perform and provided with independent distributing, stirring and ejection devices. The treatment zone is of special importance, because the material in this zone is subjected to a flow process without blocking or damming and the consequent damage to the material and is given a vigorous upward movement, every particle of the slices being washed by the liquid which flows in countercurrent thereto.

I claim:

1. Apparatus for extracting, bleaching and washing of vegetable and animal materials, in particular sugar beet slices, comminuted sugar cane and cellulose with the employment of an extraction liquid, comprising a tower, a rotatable shaft extending along the axis of said tower, means for rotating said shaft, conveyer means fixed to said shaft for conveying said material upwardly from the bottom of said tower to the top of said tower, said tower containing four zones consisting of a stirring zone at the bottom of said tower, a separating zone above said stirring zone, an extraction zone above said separating zone, said extraction zone being substantially in the middle of said tower, an ejection zone, said stirring zone having an outlet through which said extraction liquid flows and an inlet, a screen covering said outlet and means for pumping said material through said inlet into said stirring zone, said conveyer means comprising blades projecting radially from said rotatable shaft within said stirring zone, a worm conveyer secured to said shaft above said radially projecting blades and positioned in said separating zone, said blades conveying the material from said stirring zone to said separating zone, said worm conveyer conveying the material from said separating zone to said extraction zone, said conveyer means further comprising inclined vanes projecting radially from said shafts in said extraction zone, said vanes being arranged in blade wheels around the periphery of said shaft with the vanes in one blade wheel disposed opposite spaces between the blades in adjacent blade wheels, said blade wheels being spaced to provide free spaces therebetween in said extraction zone, said free spaces being free from fixed structures preventing the conveying of the material and having a height substantially equal to the height of said blade wheels, the ratio of the diameter of the rotatable shaft to the inner diameter of the tower being within the range of 2:5 and 1:2, the pitch angle of the blades ranging between 10° and 25°, guide plates secured inwardly of said tower in the ejection zone and extending radially into spaces between two adjacent blade wheels for effecting conveyance of the material, said discharge zone having an outlet opening and a worm conveyer in said discharge zone for discharging said material through said opening.

2. The apparatus according to claim 1, wherein in the extraction zone there are provided in the free spaces between the blade wheels a plurality of guide plates secured to said tower and extending radially into said spaces, said guide plates being angularly displaceable about axes perpendicular to the tower axis.

3. The apparatus according to claim 1, wherein a plurality of guide plates are secured to said tower inwardly and radially thereof, said guide plates having upper and lower edge portions aligned with the respective edge portions of said wheel blades, said guide plates being inclined about a horizontal axis and spaced from said wheel blades.

References Cited in the file of this patent

UNITED STATES PATENTS

| | | |
|---|---|---|
| 2,156,236 | Bonotto | Apr. 25, 1939 |
| 2,183,837 | Hamilton et al. | Dec. 19, 1939 |
| 2,828,230 | Heinrich | Mar. 25, 1958 |
| 2,875,907 | Kaether et al. | Oct. 28, 1958 |